United States Patent [19]

Batutis et al.

[11] 4,278,545
[45] Jul. 14, 1981

[54] APPARATUS FOR SEPARATING SOLIDS AND LIQUID COMPONENTS

[75] Inventors: Edward F. Batutis, Phoenixville; Edward Rodriguez, Bensalem; Walter R. Kugler, Norristown, all of Pa.

[73] Assignee: The Bendix Corporation, Southfield, Mich.

[21] Appl. No.: 74,832

[22] Filed: Sep. 12, 1979

[51] Int. Cl.³ .............................................. B01D 21/00
[52] U.S. Cl. ................................ 210/521; 210/DIG. 5
[58] Field of Search ......... 210/241, 521, 522, DIG. 5; 55/178

[56] References Cited

U.S. PATENT DOCUMENTS

| | | | |
|---|---|---|---|
| 367,308 | 7/1887 | Macnab, Sr. et al. | 210/521 |
| 1,732,386 | 10/1929 | Sprockhoff | 210/521 X |
| 2,119,013 | 5/1938 | Kerns et al. | 210/521 |
| 2,508,528 | 5/1950 | McPherson | 55/178 |
| 3,399,135 | 8/1968 | Conley, Jr. et al. | 210/521 X |
| 3,847,813 | 11/1974 | Castelli | 210/522 X |
| 3,957,656 | 5/1976 | Castelli | 210/521 |
| 4,082,672 | 4/1978 | Petroski | 210/241 X |
| 4,133,771 | 1/1979 | Pielkenrood | 210/521 X |

FOREIGN PATENT DOCUMENTS 1098155 7/1955 France .
2386328 12/1978 France ..................................... 210/522

Primary Examiner—Robert H. Spitzer
Attorney, Agent, or Firm—Ken C. Decker; William N. Antonis

[57] ABSTRACT

An apparatus for separating solids and liquid components of different densities from a fluid mixture or emulsion. The apparatus is comprised of a stack of vertically disposed spaced plates that are positioned within a container and between an inlet and an outlet. The plates are corrugated and the fluid mixture flows from the inlet, and through the stack, parallel to the corrugations, whereby the solids in the mixture drop through to the bottom of the plates, and the light density liquid components flow up toward the top of the stack, while the heavy density liquid components pass through the lower portion of the stack and out towards the outlet.

10 Claims, 4 Drawing Figures

APPARATUS FOR SEPARATING SOLIDS AND LIQUID COMPONENTS

BACKGROUND OF THE INVENTION

1. Field of the Invention

This invention relates to plate separators for fluid mixtures, and more particularly to a separator adapted for separating an oil/water mixture contaminated with solids, such as sand or dirt.

2. Description of the Prior Art

In U.S. Pat. Nos. 3,847,813 and 3,957,656, assigned to the same assignee as the assignee of the present invention, there is disclosed a system for eliminating oil from water using a stack of horizontally aligned corrugated plates. However, inasmuch as many oil/water mixtures contain solids, such as dirt or sand therein, the horizontally aligned plates provide no means for removing the solid materials while the system is operational. Thus these solids collect between the plates and frequently clog the system. This results in the need for a regular maintenance cycle, whereby the system must be shut down in order to clean and remove the solid matter from the stack of plates.

OBJECT OF THE INVENTION

It is therefore an object of this invention to provide an improved apparatus for separating liquid components from a fluid mixture, which mixture may be contaminated with solids, such as dirt and/or sand.

It is another object of this invention to provide an apparatus for separating oil from water wherein such apparatus has no need for a separate maintenance cycle to remove solids from its coalescing plates.

This and other objects will be pointed out hereafter.

SUMMARY OF THE INVENTION

According to a broad aspect of the invention there is provided an apparatus for separating solids and liquid components of different densities from a fluid mixture or emulsion. The apparatus includes at least one stack of vertically disposed spaced plates that are positioned within a container and between an inlet for introducing the fluid mixture into the container and outlets for discharging the separated liquids from the container. The plates have approximately sinusoidal cross sectional corrugations positioned parallel to the flow of the mixture, which corrugations form alternately constricting and expanding passages. A V shaped trough is positioned beneath and in juxtaposition with the stack of plates for collecting and removing solids which are separated from the mixture during the passage of the mixture through the stack. The plates have bleed holes therein at the peaks of the corrugations to allow for equilization of pressure between adjacent regions of the stack.

DESCRIPTION OF THE PREFERRED EMBODIMENT

Figure 1:
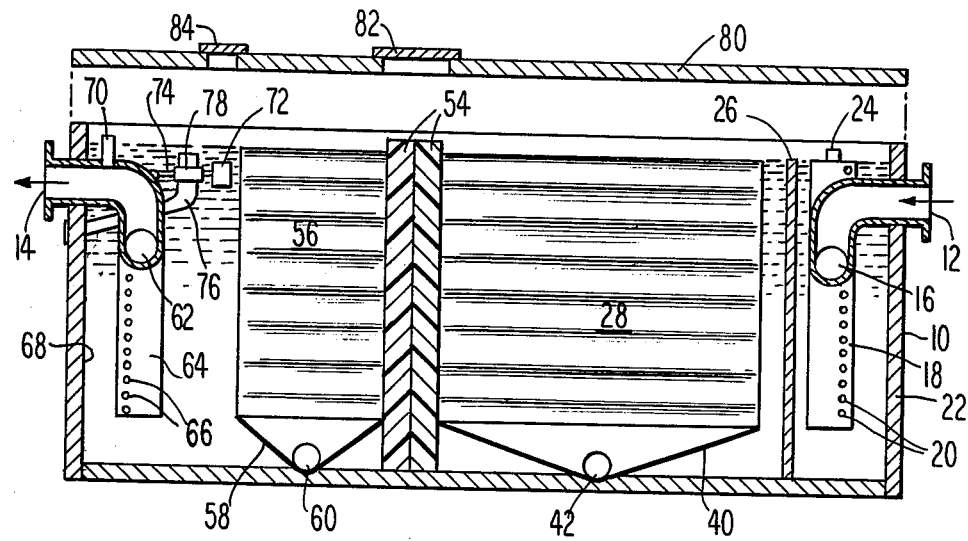
FIG. 1 is a cross section of a vertical plate separator in accordance with the invention.

Referring to FIG. 1, an apparatus for separating solids and liquid components of different densities in a fluid mixture or emulsion is provided within a container 10, which container can be constructed of any suitable material, such as mild steel coated with coal tar epoxy on the inside surfaces and epoxy paint on the exterior surfaces thereof. All internal components of the apparatus are constructed of plastic, stainless steel or a steel coated with coal tar epoxy so as to be uneffected by most corrosive chemicals.

Container 10 has a flanged intake pipe 12 at one end, and a flanged discharged pipe 14 at another end thereof. A transverse manifold 16 is connected to intake pipe 12, and has two or more vertical distribution pipes 18 connected thereto. Each distribution pipe 18 can have a plurality of holes 20 on a portion thereof, which holes generally face an adjacent container wall 22. The fluid mixture, which in the preferred embodiment is comprised of solid materials (dirt or sand) and oil dispersed within water, enters through intake pipe 12 so as to be fairly evenly distributed throughout this intake end of container 10. Vents 24 are provided at the top of vertical distribution pipes 18 to permit the escape of excess gasses.

Even distribution of the influent fluid mixture is desired in order to minimize turbulence which would otherwise impede separation of the solids and liquid components. Further flow equalization may be achieved by using a flow equalization baffle 26 that is comprised of a plurality of parallel vertically spaced slats.

Figure 2:
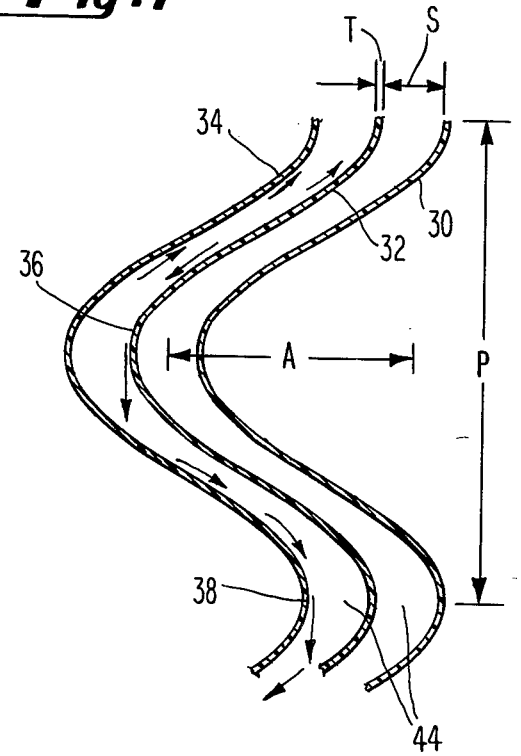
FIG. 2 is a partial cross section of some vertically positioned plates within the apparatus shown in FIG. 1.

The mixture, which has passed through the flow equalization baffle 26, next enters a stack 28 of vertically disposed spaced plates. Separation of the solids and liquid components is enhanced by dividing the influent flow into thin layers by using closely spaced plates to form flow passages. Portions of three adjacent plates 30, 32 and 34 are shown in FIG. 2, wherein the lighter liquid components, such as oil tends to coalesce on a surface of any adjacent plate, and move towards the top of that plate as symbolized by the upwardly directed arrows, while the heavier water passes through the lower portions of the plates. Referring now to the adjacent surfaces of plates 32 and 34, solids coalesce on plate 32, and being heavier than the oil and water, these solids slide down along the surface of one sloped section of that plate, and after passing a peak or crest 36 in that plate, the solids cascade straight down and coalesce on the adjacent surface of plate 34 as symbolized by the downwardly directed arrows. The solids continue their downward movement along a succeeding sloped section of plate 34, until they reach a crest or peak 38 in that plate, and the solids then cascades vertically down to the next succeeding sloped surface of adjacent plate 32. The sloped sections of plates 30, 32 and 34 should be approximately at an angle of 45° to 85° with the horizontal plane in order to insure that enough momentum is imparted to the separated solids so that they continue their downward movement within the plates until they eventually collect at the bottom of the stack in a trough 40. Trough 40 positioned beneath and in juxtaposition with stack 28, provides a means for collecting and removing the solids. The solids collected within the bottom of trough 40 can be removed from container 10 by injecting or forcing a stream of liquid through a port on one side (not shown) of the container at one end of the trough and out through a port 42 on the other side of the container at the other end of the trough.

In accordance with the invention, and as shown in FIG. 2, flow passages 44 of stack 28 are made to alternately constrict and expand. The fluid mixture passes therethrough, and thereby alternately accelerates and decelerates in a gently pulsating manner. In the case of an oil/water mixture, the oil (the dispersed medium) is in the form of drops of various sizes. As a small oil drop collides with a larger oil drop, they coalesce into a still larger drop. Coalescence, and consequently liquid component separation, can be enhanced by increasing the frequency of collision of the drops. During accelaration or deceleration, oil drops will move at a rate proportional to their size. Relative motion between drops of different sizes therefore occurs, thereby increasing the collisions by an amount in excess over which would otherwise occur under constant velocity conditions.

The nature of the fluid mixture is such that the dispersed medium is so finely defined that it will not separate by gravity along (at least not for an inadvertently long period of time). In fact a typical application of this invention is in the treatment of an oil/water mixture which has already been subjected to gravity separation. The coalescing of the minute drops of oil is consequently necessary for separation from the dispersion medium, such as water. The larger the oil drops the faster they will rise. The plates of stack 28 are vertically positioned, so that the corrugations in the plates are positioned parallel to the flow of the fluid mixture between intake pipe 12 and discharge pipe 14. This enhances the probability that oil will coalesce on the surfaces of the vertical stack of plates. On the other hand, if the plates were vertically positioned so that the corrugations were perpendicular to the flow of the mixture therethrough, there is a greater chance that the finely dispersed oil droplets would pass right through the stack without ever coalescing on a plate, the results of which would be that oil would still remain dispersed in the water exiting the container at discharge pipe 14.

Although many forms of alternately constricting and expanding passages can be defined, some design restrictions exist. If changes in the size of the passages are made angular or abrupt, turbulence will be induced which will tend to break up coalesced oil drops rather than to form them.

As shown in FIG. 2, stack 28 is comprised of a plurality of thin plates having a wavy cross section. Also as shown in FIG. 2, plates 30, 32 and 34 are in the form of a sine wave having a Pitch P and an amplitude A. The plates are preferably made of oleophilic material having a desired thickness T, and have a maximum spacing S therebetween.

One example of plate separator dimensions which can be used are as follows:

P=2.66"
A=1"
T=0.060"
S having a range from $\frac{1}{8}$" to 1"

An example of oleophilic material that can be used for the plates is polypropylene or fiberglas. While the plates in FIG. 2 have a sine wave configuration, the corrugations can be made to approximate a sine wave as shown in FIG. 3, wherein plates 45 and 46 can be comprised of narrow straight sections which are connected by wider curvilinear sections.

Figure 3:
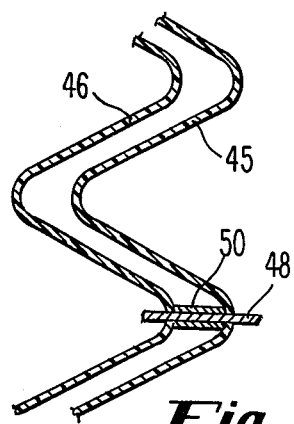
FIG. 3 is another partial cross section of a pair of plates illustrating a means for effectuating a desired spacing of these plates.

Also as illustrated in FIG. 3, a tie rod 48 in conjunction with a spool 50 are used to establish the desired spacing between the plates.

Figure 4:
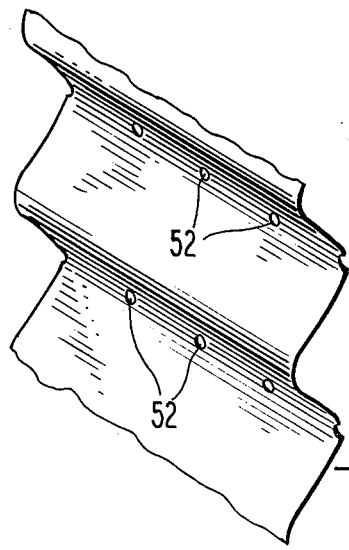
FIG. 4 is an isometric view of a plate employed in the apparatus of FIG. 1.

As illustrated in FIG. 4, bleed holes 52 are provided at the peaks or crests of the plates so as to equalize pressure within stack 28, and prevent a pressure imbalance due to a large buildup of oil or solids in one region of the stack. Semicircular bleed holes may also be provided at the edge/ends of the plates which together with similarly located semicircular bleed holes in adjacent plates combine to form circular bleed holes. Certain bleed holes may be used to contain tie rods which help form and hold a unitary stack of plates having an appropriate space between the plates.

When treating some fluid mixtures, adequate solids and liquid components separation may be achieved solely by the use of the apparatus so far described. In other instances, the addition of coalescing filters 54 (as shown in FIG. 1) may enhance the process. Satisfactory results have been achieved for oil water separation using Industrial Scott Foam, produced by Scott Paper Company, as a filter material. Other suitable types of filter material can be provided by a brush like material having a randomly oriented oleophilic fibrous matrix, wherein the fibers have a mean diameter of less than approximately 150 microns.

If further solids and liquid components separation would be required, an additional vertically disposed stack 56 of plates shown in FIG. 1 can also be used, wherein the space between the plates of stack 56 are less than the space between the plates of stack 28. In such an instance, the space between the plates in stack 28 could be $\frac{1}{2}$", while the space between the plates in stack 56 could be $\frac{1}{4}$". As also shown in FIG. 1, a trough 58 will be positioned beneath and in juxtaposition with stack 56 and have a port 60 at one end thereof. Trough 58 and port 60 will operate in the same manner as and serve the same purpose as trough 40 and port 42 located beneath stack 28.

Flanged discharge pipe 14 is connected to a transverse manifold 62 which has two or more vertical collection pipes 64 depending therefrom. Collection pipes 64 can have a plurality of holes 66 within a portion thereof that face a container wall 68. It should be noted that while distribution pipes 18 extend up to the surface of the mixture, collection pipes 64 are designed to collect liquid well below the surface so as to avoid draining from the container the less dense components that have been separated and are confined to the top of the liquid body after passing through stack 56. A vent 70 is provided to avoid a siphoning action which might otherwise tend to empty out container 10. In this example the dispersed medium, i.e. oil which has been separated after passing through stack 56, collects at the top of the liquid to form a layer of film over a water effluent, which water effluent will be discharged through pipe 14. A float 72 is attached to a pivot arm 74, and supports a flexible conduit 76, which conduit is held within a collar 78. Conduit 76 is open at its top so as to drain therethrough the oil film which has collected. The position of the conduit within collar 78 is preferably made to be adjustable in order to permit a change in the position of its open end in order to adapt it to various thicknesses of oil film which may be formed.

A cover 80 is provided for container 10 in order to minimize oxidation of parts of the apparatus, and also to permit the apparatus to be placed out doors. An access cover 82 for container cover 80 is provided, so that when the access cover is removed, filters 54 can be reached and may be replaced or removed for cleaning. Similarly another access cover 84 for container 80 is provided, so that when access cover 84 is removed, float 72 and the position of the open end of conduit 76 can be readily adjusted.

Although this invention has been described with reference to a specific embodiment thereof, numerous modifications are possible without departing from the invention, and it is desirable to cover all modifications falling within the spirit and scope of this invention.

What we claim as new and desire to secure by Letters Patent of the United States is:

1. Apparatus for separating solids and components of different densities in a fluid mixture or emulsion comprising:
   a. a container;
   b. inlet means for introducing said mixture into said container to minimize turbulence within said container;
   c. first discharge means for removing a more dense component at a level below the level of a less dense component;
   d. a plurality of vertically disposed spaced plates positioned within said container and between said inlet means and said first discharge means, said plates having approximately sinusoidal corrugations in a cross-sectional plane transverse to the direction of fluid flow, each of said plates, and the corrugations therein, extending parallel to the direction of fluid flow and cooperating with at least one adjacent plate to define a vertically extending flowpath between the inlet and the first discharge means, said corrugations forming alternately constricting and expanding passages;
   e. second discharge means for removing the less dense component at a level above the level of the more dense component; and
   f. means, positioned beneath and in juxtaposition with said plates, for collecting and then removing said solids.

2. Apparatus for separating solids and components of different densities in a fluid mixture or emulsion according to claim 1, further comprising:
   a second stack of vertically disposed spaced plates positioned within said container and between said one stack and said first discharge means, wherein the space between the plates of said second stack is less than the space between the plates of said one stack.

3. Apparatus for separating solids and components of different densities in a fluid mixture or emulsion according to claim 1, wherein said spaced plates have bleed holes therein at the peaks of said sinusoidal corrugations to allow for equalization of pressure between adjacent regions of said one stack.

4. Apparatus for separating solids and components of different densities in a fluid mixture or emulsion according to claim 1, wherein said solid collecting and removing means is comprised of a trough, and means to communicate a fluid stream into one end of said trough, said fluid stream exiting the opposite end of said trough to flush the collected solids out from the bottom of said trough.

5. Apparatus for separating components of different densities in a fluid mixture, said apparatus comprising a container, an inlet for introducing said mixture into said container, first discharge means for removing the more dense component of said fluid mixture at a level below the level of said less dense component, a plurality of plates in said container, each of said plates extending vertically from a point adjacent the upper surface of said fluid mixture toward the bottom surface of said fluid mixture and also extending generally in the direction of fluid flow between the inlet and first discharge means to define vertically extending fluid flow paths between said plates between the inlet and the first discharge means, said plates having corrugations extending parallel to the direction of fluid flow such that the distance between each of said plates and a corresponding adjacent plate varies along the surface of the plate between the upper surface of said fluid mixture to the bottom surface thereof so that the width of the fluid flow paths varies at different horizontal cross sectional planes taken through said plates, and second discharge means for removing the less dense component at a level above the level of the more dense component.

6. Apparatus for separating fluid components of different densities in a fluid mixture according to claim 5, in which the fluid flow paths between one of said plates and corresponding adjacent plate have a substantially sinusoidal configuration.

7. Apparatus for separating fluid components of different densities in a fluid mixture according to claim 6, in which said corrugations are substantially sinusoidal in a cross sectional plane transverse to the direction of fluid flow.

8. Apparatus for separating fluid components of different densities in a fluid mixture according to claim 7, in which each of said corrugations has a series of peaks alternating with connecting sections interconnecting said peaks, the peaks of each plate nesting within the peaks of a corresponding adjacent plate, the spacing between the peaks on one of said plates to corresponding peaks on an adjacent plate being greater than the spacing between the adjacent connecting section on said one plate and the corresponding connecting section on said adjacent plate.

9. Apparatus for separating fluid components of different densities in a fluid mixture according to claim 8, and bleed holes in at least some of the peaks of at least some of the plates to equalize pressure across the plates.

10. Apparatus for separating fluid components of different densities in a fluid mixture according to claim 8, and structure interconnecting at least some of the peaks of some of the plates with a corresponding peak of an adjacent plate to regulate the spacing between the plates.

* * * * *